United States Patent
Bremner et al.

(10) Patent No.: US 6,552,961 B1
(45) Date of Patent: *Apr. 22, 2003

(54) SEISMIC SOURCE SENSOR

(75) Inventors: Douglas L. Bremner, Houston, TX (US); Loran D. Ambs, Fulshear, TX (US)

(73) Assignee: WesternGeco, L.L.C., Houston, TX (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/643,545

(22) Filed: Aug. 22, 2000

(51) Int. Cl.⁷ .............................. G01V 1/04; G01V 1/38
(52) U.S. Cl. ..................... 367/23; 367/159; 181/110; 181/120
(58) Field of Search .................. 367/14, 15, 23, 367/140, 141, 160, 161, 189, 159; 181/110, 113, 120; 310/800

(56) References Cited

U.S. PATENT DOCUMENTS

| | | | |
|---|---|---|---|
| 4,184,144 A | 1/1980 | Rickenbacker | 367/137 |
| 4,646,274 A | 2/1987 | Martinez | 367/41 |
| 4,664,223 A | 5/1987 | Huizer et al. | 181/113 |
| 4,670,863 A | 6/1987 | Sallas | 367/190 |
| 4,750,157 A | 6/1988 | Shei | 367/45 |
| 4,755,976 A | 7/1988 | Edelmann | 367/189 |
| 4,789,971 A | 12/1988 | Powers et al. | 367/152 |
| 4,810,913 A * | 3/1989 | Beauducel et al. | 367/160 |
| 4,960,183 A * | 10/1990 | Young, II | 181/107 |
| 5,103,130 A | 4/1992 | Rolt | 310/337 |
| 5,184,329 A * | 2/1993 | Regnault et al. | 367/23 |
| 5,239,518 A * | 8/1993 | Kazmar | 367/163 |
| 5,357,486 A * | 10/1994 | Pearce | 181/110 |
| 5,361,240 A | 11/1994 | Pearce | 367/157 |
| 5,774,423 A | 6/1998 | Pearce et al. | 367/157 |
| 5,790,473 A | 8/1998 | Allen | 367/57 |
| 6,148,952 A * | 11/2000 | Johnston et al. | 181/120 |

FOREIGN PATENT DOCUMENTS

FR    2 433 762    3/1980    .......... G01V/1/047

OTHER PUBLICATIONS

International Search Report, International Application No. PCT/US 01/26179, dated Mar. 19, 2002.

* cited by examiner

*Primary Examiner*—Ian J. Lobo
(74) *Attorney, Agent, or Firm*—David S. Figatner; Moser, Patterson & Sheridan, L.L.P.

(57) ABSTRACT

A system for detecting source acoustic energy in seismic operations. The system is operable on land and in marine applications. On land, a piezoelectric film is positioned between a vibrator or other source baseplate and the soil. Compression of the piezoelectric film generates an electrical signal proportional to the total ground force, including force due to flexural or resonance of source components, exerted by the seismic source. In marine applications, a source displaces water to produce a pressure pulse in the water, and a piezoelectric film detects the resulting pressure pulse and the flexural movement of the source to produce an electrical signal proportional to the movement of the active component.

31 Claims, 2 Drawing Sheets

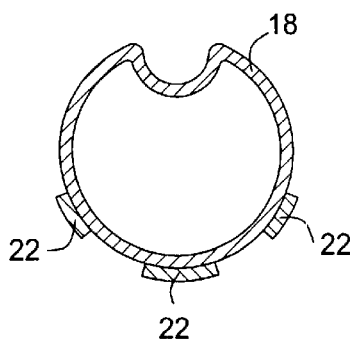
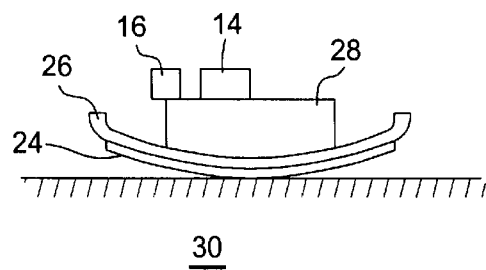
FIG. 3       FIG. 4
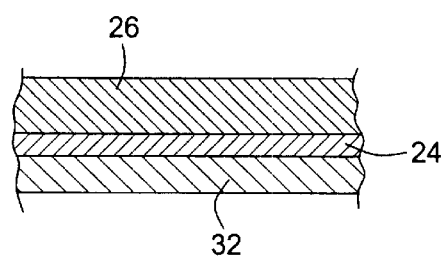
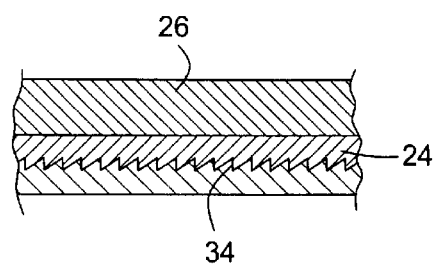
FIG. 5       FIG. 6

SEISMIC SOURCE SENSOR

BACKGROUND OF THE INVENTION

The present invention relates to the field of seismic source detection in geophysical operations. More particularly, the invention relates to a seismic source sensor for detecting operation of a seismic source in water or on land.

Seismic energy sources transmit acoustic energy into land or water surfaces which propagates downwardly through underlying geologic formations. The interfaces and features of subsurface geologic formations reflect a portion of the acoustic source energy which moves upwardly to the land or water surface where it is recorded. On land, explosives, vibrators, and other devices generate the seismic energy. The receiver elements are deployed at or near the surface of the Earth. In water, the acoustic source energy is generated using air guns or other water displacing devices. The seismic cables and associated receiver elements are towed behind marine seismic vessels or are laid on the seafloor.

The reflected seismic source energy is detected with hydrophone and geophone sensors located at a distance from the seismic source. Pressure sensitive type films have been used in U.S. Pat. No. 4,789,971 to Powers et al. (1988), which disclosed an acoustic hydrophone formed with polyvinylidene flouride (PVDF). Another acoustic sensor was disclosed in U.S. Pat. No. 5,361,240 to Pearce (1994) wherein a flexible piezoelectric film was wrapped several times around a mandrel. A hollow space between the film and the mandrel provided a pressure compensation chamber to permit activation of the film. Another acoustic sensor was disclosed in U.S. Pat. No. 5,774,423 to Pearce et al. (1998) wherein a flexible piezoelectric material was encapsulated within a segmented housing. Two or more clam shell type housings were fastened to a cable to form a hydrophone and a hollow space permitted flexure of the piezoelectric material.

Because of the depth of the geologic formations under investigation, hydrophone and geophone sensors are typically located at a significant distance from the seismic source. Therefore, the energy detected by the hydrophone and geophone sensors represents a "far-field" energy pulse resulting from transmission of the seismic source. The transmitted seismic pulse obtained from a point on or near the source does not accurately characterize the far-field signal observed at the seismic sensors. Conventional sensors used to detect the energy output of the source are located at discrete points on or near the energy source. Because the sensors occupy discrete positions they cannot sense the total energy output of the energy source. Current practice involves estimates of the far-field signal from either the weighted sum of the vibrator and reaction mass signals, known as ground force, of a land vibrator or near-field hydrophone measurements made near a marine source. Although such estimates represent an improvement over previous methods, such estimates do not reflect the total energy output of the seismic source and do not adequately represent the far-field signature of the source.

A need exists for a system capable of predicting the far-field acoustic signal initiated by a seismic source. This prediction can be made by assessing movement of the seismic energy source during source activation. However, tests of seismic sources such as slotted cylinders, vibrators and similar sources demonstrate that the active components of such devices do not move uniformly during activation. For the seismic frequency range of interest, generally between two and one hundred-twenty Hertz, land sources exhibit a very complex motion. The source baseplate often flexes due to the force being used to vibrate the Earth surface. The source may rock back and forth due to uneven ground. Resonances within the source structure may be transmitted through the vibrator baseplate into the ground. Because all of these motions cause energy to be input into the ground, such motions should be represented in the far-field signature so that they are treated as part of the signal rather than undesirable noise.

The current practice of utilizing discrete sensors to measure the source output ignores these energy sources. The acoustic pulse of a wavetrain produced by a marine seismic source depends on the total displacement of water by the transducer. Local variations in component motion have some effect on the far-field acoustic signal. The total range of displacement of the seismic source actuator affects low frequency signal generation. Attempts to characterize the far-field acoustic signal from such marine seismic sources have required numerous sensors on or near the source exterior and have not been possible with a single sensor.

Various systems have been proposed to predict far-field signal transmission from a seismic source. For example, one system was described in U.S. Pat. No. 4,184,144 to Rickenbacker, which measured the output force of a seismic vibrator. U.S. Pat. No. 4,646,274 to Martinez disclosed a method and apparatus for correcting distorted seismic data. U.S. Pat. No. 4,670,863 to Sallas and Trevino disclosed a vibrator seismic source having a distortion limiting control system. U.S. Pat. No. 4,750,157 to Shei disclosed a seismic vibrator impedance determination and compensation system. U.S. Pat. No. 4,755,976 to Edelmann disclosed a method and apparatus for controlling and analyzing energy transfer to soil, and U.S. Pat. No. 5,790,473 to Allen described a high fidelity vibratory source seismic method for use with a plurality of seismic sources.

Conventional source sensors do not effectively measure the far-field performance of a seismic source. The performance of land vibrators or other seismic sources is difficult to measure due to the complex nature of the movements of the source components. On land, prior efforts to characterize vibrator ground force at the baseplate-soil interface have been indirect. Single sensors on or near the moving components of the source have been used to infer the source output. These sensors could not, however, accurately measure such force because of baseplate flexibility and near-surface inhomogenieties. Similarly, accelerometer data from a relatively small number of points on the baseplate have been used to infer the force exerted on the ground, however such accelerometer data do not accurately represent the baseplate motion.

Accelerometers and other sensors located at the seismic source detect near-field representation at distinct points and do not accurately characterize the far field acoustic energy pulse. Previous attempts to directly measure the total ground force signal generated by the source have involved large, heavy force tiles which are difficult by their nature to use in a production mode.

The performance of air guns, slotted cylinders and other marine acoustic seismic sources is extremely difficult to measure, and the configuration and movement of each source often generate different source energy for each seismic event.

Because seismic sources generate different signals during each seismic event, differences in the far-field data will be affected by such source variations and complicate the assessment of reflected signals. Prediction and adjustment for variations in the source events is essential to accurate assessment and characterization of the reflected signals, and a need exists for an improved system capable of assessing seismic source operation.

SUMMARY OF THE INVENTION

The present invention provides an acoustic source sensor system for use in seismic operations. The system comprises a seismic source activatable to generate an acoustic energy event, a pressure sensitive film responsive to the acoustic energy event which is disposed at least partially about the source, a connector engaged with the film for detecting response of the film to the acoustic energy event and for transmitting an electric signal representing the film response, and a controller engaged with the connector for receiving the electrical signal.

One embodiment of the invention comprises a seismic source activatable to generate an acoustic energy event in water, a pressure sensitive film disposed at least partially about the source, a connector engaged with the film for detecting response of the film to the acoustic energy event and for transmitting an electric signal representing the film response, and a controller engaged with the connector for receiving the electrical signal.

Another embodiment of the invention comprises a seismic source activatable to generate an acoustic energy event discharging energy into soil, a pressure sensitive film disposed between the source and the soil, a connector engaged with the film for detecting response of the film to the acoustic energy event and for transmitting an electric signal representing the film response, and a controller engaged with the connector for receiving the electrical signal.

BRIEF DESCRIPTION OF THE DRAWINGS

FIG. 3 illustrates discrete film elements on a slotted cylinder.

FIG. 4 illustrates a film in cooperation with a vibratory baseplate.

FIG. 5 illustrates a cover engaged with a film.

FIG. 6 illustrates a web integrated within a film for preserving the physical integrity of the film.

DESCRIPTION OF THE PREFERRED EMBODIMENTS

Figure 1:
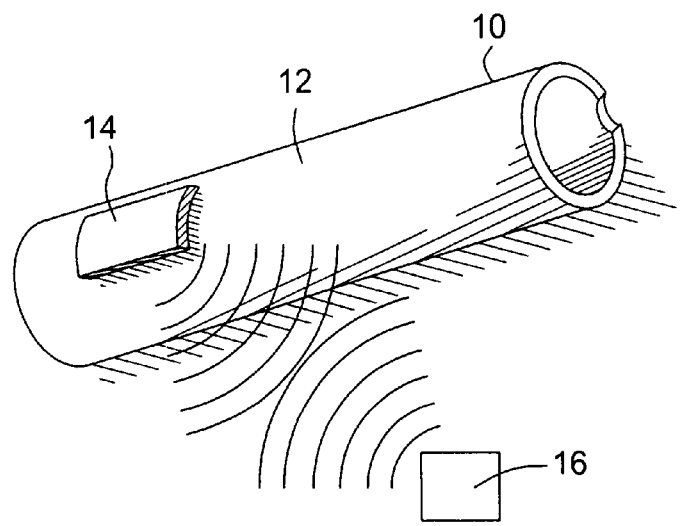
FIG. 1 illustrates a system having a piezoelectric film engaged with a seismic source.

The invention provides a unique system for characterizing acoustic source energy and for predicting far-field acoustic signal produced by a seismic source. Referring to FIG. 1, seismic source 10 is activatable to generate an acoustic energy event. Pressure sensitive film 12 is disposed at least partially about source 10 and is responsive to the acoustic energy event. Connector 14 is engaged with film 12 for detecting response of film 12 to the acoustic energy event and for transmitting an electrical signal such as a voltage which represents the response of film 12. Controller 16 is engaged with connector 14 for receiving the electrical signal.

Figure 2:
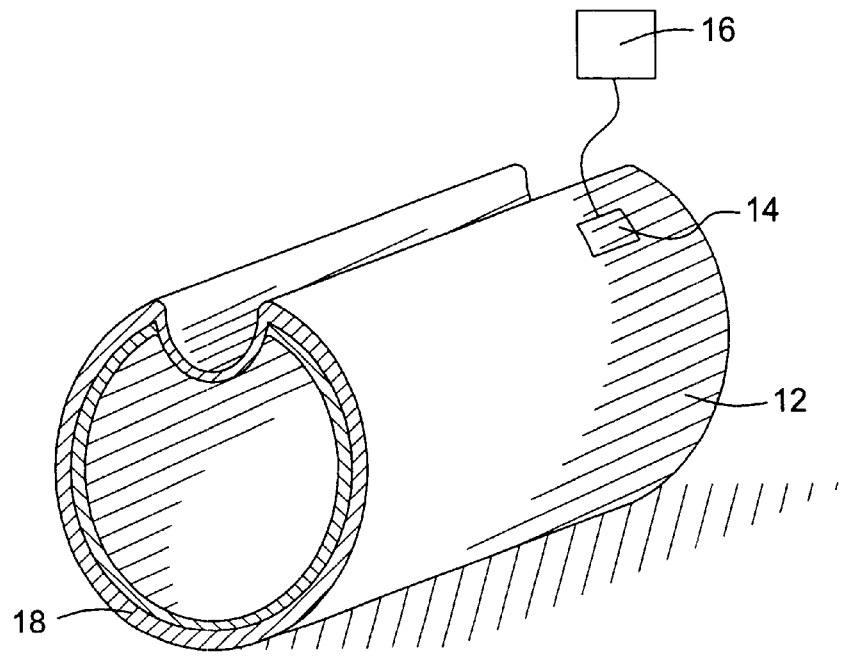
FIG. 2 illustrates a film in cooperation with a marine slotted cylinder.

FIG. 2 illustrates one embodiment of the invention wherein a seismic source such as slotted cylinder 18 is engaged with pressure sensitive film 12. Connector 14 is attached between film 12 and controller 16. When slotted cylinder 18 is activated to generate acoustic pulse energy by displacing water 20, film 12 responds proportionally to the movement of slotted cylinder 18. The magnitude, duration, and form of the film 12 response can be processed by controller 16 to characterize the acoustic pulse energy produced in water 20. Such result can be stored for comparison with prior test data, or can be compared with calculated results to predict the resulting far-field acoustic signal.

Because film 12 stretches or compresses proportionally with the movement of slotted cylinder 18, film 12 provides the equivalent sensing capability of multiple point sensors located on a surface of slotted cylinder 18. Connector 14 and controller 16 can utilize the film 12 response to such movement to control the output of the source.

FIG. 3 illustrates another embodiment of the invention wherein piezoelectric film elements 22 are positioned on the surface of a slotted cylinder 18 to more closely characterize the movement of the slotted cylinder 18 structure. For example, a plurality of connectors 14 can be engaged with film 12 at various contact locations to detect movement of slotted cylinder 18 in one or more locations or directions. In the cases where multiple film elements are used to determine the total output, the responses of the individual film elements can be added to determine the total ground force output of the source. All but the largest sources will behave as a point source and will have little if any directivity. Higher frequency sources such as those used for sub-bottom profiling or engineering studies may benefit from characterizing the directionality of the source, and source directivity is more pronounced at high frequencies. If a separate sensor were placed on the top of the source the source ghost code should be detectable. This information could be used to estimate source depth or sea state.

FIG. 4 illustrates another embodiment of the invention wherein pressure sensitive film 24 is engaged with baseplate 26 of seismic source vibrator 28 positioned to insonify soil 30. Film 24 is compressed by movement of baseplate 26 and a signal representing such response is detected with connector 14 for transmission to controller 16. Film 24 provides the benefit of providing data from a single sensor responsive to the force (or motion) from a substantial area of the energy radiating surface. Film 24 is more reliable than multiple point source sensors and is less subject to damage caused by baseplate 26. To further isolate film 24 from damage caused by abrasion, wear, tearing, puncture or other contact with baseplate 26, cover 32 can be placed over film 24 to provide a shield between film 24 and soil 30 as shown in FIG. 5. In another embodiment of the invention, web 36 can be integrated within film 24 as illustrated in FIG. 6. Web 36 can comprise a structural member integrated adjacent to or into film 24. Moreover, web 36 can be formed with a metallic, plastic, or composite material such as a fiber reinforced elastic material.

This embodiment of the invention provides a system for measuring ground force directly at the baseplate-ground interface. Ground force has been shown to be a very close approximation of the far-field signature of a land seismic source. A seismic source sensor such as piezoelectric film 24 is attached to the underside of baseplate 26, either in its entirety or over a selected portion of baseplate 26. Piezoelectric films such as film 24 are sensitive to compression, stretch, and bending. When compressed, piezoelectric films produce a voltage linearly proportional to the compression force. If the surface of film 24 is connected to common electrodes, the total force applied to the film surface is indicated by electrical signals.

In another embodiment of the invention, vibrator baseplate 26 can be engaged with at least two film elements positioned in a selected orientation as described for the marine source identified in FIG. 3. A two dimensional array can be formed with a series of line elements or patches of film elements. In another embodiment, piezoelectric material can be extruded into a selected shape such as a cable which can be positioned in one continuous length or in segments connected electrically. Strips or film elements can be laid in one or more directions to form a two-dimensional sensor capable of characterizing the force or movement of source.

Recently developed techniques use flexible piezoelectric film such as Kynar as the sensing element. Piezoelectric film produces an electric signal when stressed or strained. The sensitivity of the material is anisotropic so that the magnitude of the response will vary with the direction of the applied stress. The sensitivity of piezoelectric film due to applied stress in the thickness dimension is two or three times greater than that due to stress applied in the length or width dimension.

Although film 12 can be formed with different materials, one suitable material having good acoustic transductance characteristics for seismic operations comprises polyvinylidene flouride ("PVDF"). A stress applied to film 12 with a solid backing will respond to deformation in the thickness dimension and is proportional to the product of piezo-stress constant (in the thickness direction), thickness and pressure. If film 12 is backed with a compliant backing such as foam, the signal generated by the stress is proportional to the product of the piezo-stress constant (in the length direction), length and pressure. If the length of film 12 is more than three times the thickness, the signal produced by a compliant backed film is greater than that of a solid backed film when exposed to the same pressure. For this reason, a band of piezo-film wrapped about a compliant inner core produces a significantly larger signal than the same material wrapped about a solid core.

Although only two leads or connectors 14 are illustrated in FIG. 2, multiple leads (positive and negative) can be attached to different portions of film 12. Leads such as connector 14 provide a means for communicating electric signals produced by film 12 to electronic components for further processing. Signal conditioner such as controller 16 provides temperature sensing and compensation, signal conditioning, filtering and amplification and can collect data from the film element or elements positioned on the surface of the seismic source.

The invention provides a marine seismic sensor having a surface area substantially larger than prior art sensors. Piezoelectric films produce a voltage when strained in any one of the three axes. In addition to producing an electric signal when a film is deformed by a pressure wave, film 12 produces a signal when stretched. Film 12 used as an acoustic pressure sensor may produce an unwanted signal when the sensor is stretched rather than compressed. This interfering signal can be reduced or eliminated by utilizing a combination of smaller film elements, which are less subject to stretching, and the appropriate combination of electrical signals generated from the film elements.

Depending on the way a piezoelectric film is fabricated and rolled, it may produce either a positive or negative electric signal when compressed. The undesired effect of signals produced by longitudinal stretching of film sensors could be removed by forming the sub-array of two layers of piezoelectric film where one produces a positive signal when compressed and the other produces an equal but negative signal. Both elements produce the same magnitude and polarity when deformed along the longitudinal direction. When the output of the two elements are electrically subtracted, the signal due to action normal to the film would be enhanced and the signal due to stretch would be cancelled.

The invention provides a superior system for instrumenting a seismic source so that the resulting sensor data can be evaluated to predict the resulting far-field acoustic signal. A two-dimensional motion sensor covering substantially all of the radiating surface or transducer shell provides adequate spatial sampling of the effective motion of a continuous wave source. A contiguous piezoelectric film facilitates characterization of the transducer with a single sensor, and provides the equivalent of a large number of point sensors distributed over the transducer active components. In land seismic operations, the system is suitable for vibrator sources and impactive sources such as elastic band, gas or vacuum accelerated weight drops, land airguns, weight drops or impactors. In marine seismic operations, the system is suitable for slotted cylinders, moving piston vibrators, constrained piston vibrators, flex tensional devices, or barrel-stave devices.

Although the invention has been described in terms of certain preferred embodiments, it will become apparent to those of ordinary skill in the art that modifications and improvements can be made to the inventive concepts herein without departing from the scope of the invention. The embodiments shown herein are merely illustrative of the inventive concepts and should not be interpreted as limiting the scope of the invention.

What is claimed is:

1. An acoustic source sensor system for use in seismic operations, comprising:
   a seismic source activatable to generate an acoustic energy event;
   a pressure sensitive film disposed at least partially about and in physical contact with said source, wherein said film is responsive to said acoustic energy event;
   a connector engaged with said film for detecting said film response to said acoustic energy event and for transmitting an electric signal representing said film response; and
   a controller in communication with said connector and configured for receiving said electrical signal and characterizing a total energy output of said seismic source upon generation of said acoustic energy event and wherein said controller is in communication with the seismic source for selectively transmitting a control signal to the seismic source to control at least one signal characteristic of acoustic energy events generated by the seismic source.

2. A system as recited in claim 1, wherein said source comprises a marine seismic source for generating acoustic source energy in water.

3. A system as recited in claim 2, wherein said source comprises a slotted cylinder.

4. A system as recited in claim 1, wherein said source comprises a moveable plate to transfer acoustic source energy to soil.

5. A system as recited in claim 4, wherein said source comprises a vibration baseplate in contact with the soil, and wherein said film is compressible by said baseplate.

6. A system as recited in claim 5, further comprising a cover between said film and the soil for protecting said film against damage.

7. A system as recited in claim 5, further comprising a structural web integrated with said film for protecting said film against damage.

8. A system as recited in claim 1, wherein said connector comprises a plurality of contacts engaged with said film at a plurality of positions on said film.

9. A system as recited in claim 1, wherein said film comprises at least two separate film elements located in a selected orientation relative to said source.

10. A system as recited in claim 1, further comprising a second pressure sensitive film which at least partially overlaps said first pressure sensitive film.

11. A system as recited in claim 1, wherein said second pressure sensitive film is oriented to produce an electric response opposite to the response produced by said first pressure sensitive film.

12. A system as recited in claim 1, wherein said controller is capable of detecting total force output of said seismic source and of detecting variations in the force output generated by said seismic source.

13. An acoustic source sensor system for use in marine seismic operations, comprising:
   a seismic source activatable to generate an acoustic energy event in water;
   a pressure sensitive film disposed at least partially about and in physical contact with said source, wherein said film is responsive to said acoustic energy event;
   a connector engaged with said film for detecting response of said film to said acoustic energy event and for transmitting an electric signal representing said film response; and
   a controller in communication with said connector and configured for receiving said electrical signal and characterizing a total energy output of said seismic source upon generation of said acoustic energy event and wherein said controller is in communication with the seismic source for selectively transmitting a control signal to the seismic source to control at least one signal characteristic of acoustic energy events generated by the seismic source.

14. A system as recited in claim 13, wherein said source comprises a slotted cylinder.

15. A system as recited in claim 13, wherein said source is activatable to displace the water and wherein said film is responsive to the volume of water displaced.

16. An acoustic source sensor system for use in seismic operations on soil, comprising:
   a seismic source activatable to generate an acoustic energy event discharging energy into the soil;
   a pressure sensitive film disposed between said source and the soil and in physical contact with said source, wherein said film is responsive to said acoustic energy event;
   a connector engaged with said film for detecting response of said film to said acoustic energy event and for transmitting an electric signal representing said film response; and
   a controller in communication with said connector and configured for receiving said electrical signal and characterizing a total energy output of said seismic source upon generation of said acoustic energy event and wherein said controller is in communication with the seismic source for selectively transmitting a control signal to the seismic source to control at least one signal characteristic of acoustic energy events generated by the seismic source.

17. A system as recited in claim 16, wherein said source comprises a vibration baseplate in contact with the soil and wherein said film is compressible by said baseplate.

18. A system as recited in claim 16, further comprising a cover between said film and the soil for protecting said film against damage.

19. A system as recited in claim 16, wherein said film comprises at least two film elements located in a selected orientation relative to said source.

20. A system as recited in claim 1, wherein the at least one signal characteristic controlled by said controller according to the control signal comprises at least one of the amplitude, phase and frequency.

21. A system as recited in claim 1, wherein said source is a vibratory source.

22. A system as recited in claim 1, wherein said controller is configured to adjust said at least one signal characteristic according to said control signal after characterizing said energy output of said seismic source.

23. A system as recited in claim 22, wherein the at least one signal characteristic controlled by said controller according to the control signal comprises at least one of the amplitude, phase and frequency.

24. A system as recited in claim 1, wherein said pressure sensitive film is disposed at least partially in contact with said source.

25. A system as recited in claim 24, wherein the at least one signal characteristic controlled by said controller according to the control signal comprises at least one of the amplitude, phase and frequency.

26. A system as recited in claim 13, wherein the at least one signal characteristic controlled by said controller according to the control signal comprises at least one of the amplitude, phase and frequency.

27. A system as recited in claim 26, wherein said pressure sensitive film is disposed at least partially in contact with said source.

28. A system as recited in claim 16, wherein the at least one signal characteristic controlled by said controller according to the control signal comprises at least one of the amplitude, phase and frequency.

29. A system as recited in claim 28, wherein said pressure sensitive film is disposed at least partially in contact with said source.

30. A system as recited in claim 1, wherein said pressure sensitive film is a piezoelectric film.

31. An acoustic source sensor system for use in seismic operations, comprising:
   a slotted cylinder activatable to generate an acoustic energy event in water;
   a pressure sensitive film disposed at least partially about said slotted cylinder, wherein said film is responsive to said acoustic energy event;
   a connector engaged with said film for detecting response to said film to said acoustic energy event and for transmitting an electric signal representing said film response; and
   a controller engaged with said connector for receiving said electrical signal.

* * * * *